United States Patent
Newman et al.

(10) Patent No.: US 12,417,291 B2
(45) Date of Patent: Sep. 16, 2025

(54) SYSTEM AND METHOD FOR CUSTOMIZING A VEHICLE FUNCTION

(71) Applicant: AUDI AG, Ingolstadt (DE)

(72) Inventors: John Newman, Ingolstadt (DE); Stefan Herrler, Eichstätt (DE); Felix Wittmann, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 18/257,711

(22) PCT Filed: Jul. 23, 2021

(86) PCT No.: PCT/EP2021/070728
§ 371 (c)(1),
(2) Date: Jun. 15, 2023

(87) PCT Pub. No.: WO2023/001388
PCT Pub. Date: Jan. 26, 2023

(65) Prior Publication Data
US 2024/0054222 A1    Feb. 15, 2024

(51) Int. Cl.
*G06F 21/00*    (2013.01)
*G06F 8/30*    (2018.01)
(Continued)

(52) U.S. Cl.
CPC ............. *G06F 21/572* (2013.01); *G06F 8/30* (2013.01); *H04L 67/56* (2022.05); *G06F 8/65* (2013.01)

(58) Field of Classification Search
CPC . G06F 21/572; G06F 8/30; G06F 8/65; H04L 67/56
See application file for complete search history.

(56) References Cited

U.S. PATENT DOCUMENTS

2010/0228404 A1* 9/2010 Link, II ............... G06F 9/44542
701/1
2011/0093135 A1    4/2011 Moinzadeh et al.
(Continued)

FOREIGN PATENT DOCUMENTS

| CN | 102346679 A | 2/2012 |
| CN | 102576307 A | 7/2012 |

(Continued)

OTHER PUBLICATIONS

Anders Klavmark et al., Study on Open Source In-Vehicle Infotainment (IVI) Software Platforms, Jun. 2015, [Retrieved on Jun. 6, 2025]. Retrieved from the internet: <URL: https://odr.chalmers.se/server/api/core/bitstreams/fed5b418-2a21-4177-b0db-4f449bf5ac5c/content> 79 Pages (1-79) (Year: 2015).*

(Continued)

*Primary Examiner* — Anibal Rivera
(74) *Attorney, Agent, or Firm* — Sterne, Kessler, Goldstein & Fox P.L.L.C.

(57) ABSTRACT

The approach relates to a method and system for customizing a vehicle function. The system includes a developer platform configured to create content for a predefined vehicle function and transmit the created content to a content server. The developer platform includes a validation program configured to determine if the created content violates an operation criterion of the vehicle and warn a developer and/or deny a transmission of the created content to the content server when the created content violates an operation criterion of the vehicle. The system also includes a content server configured to receive and store the created content, a mobile device having an application configured to access the content server and provide the stored content of the content server for selection, and a vehicle configured to (Continued)

S10 = Content for predefined vehicle function created

S12 = Content server stores created content

S14 = Assess stored content of content server

S16 = Determine whether content selected by user

S18 = Vehicle uses received content to customize vehicle function receive selected content and customize the vehicle function with the received content.

10 Claims, 2 Drawing Sheets

(51) Int. Cl.
    *G06F 9/44*     (2018.01)
    *G06F 9/445*     (2018.01)
    *G06F 11/14*     (2006.01)
    *G06F 21/57*     (2013.01)
    *H04L 67/56*     (2022.01)
    *G06F 8/65*     (2018.01)

(56) References Cited

U.S. PATENT DOCUMENTS

| | | |
|---|---|---|
| 2012/0030512 A1 | 2/2012 | Wadhwa et al. |
| 2013/0055211 A1* | 2/2013 | Fosback ................ G06Q 10/06 717/126 |
| 2013/0318614 A1* | 11/2013 | Archer ................ G06F 21/577 726/25 |
| 2017/0060568 A1 | 3/2017 | Seibert, Jr. et al. |
| 2017/0078398 A1 | 3/2017 | Haidar et al. |
| 2019/0274018 A1* | 9/2019 | Mosenia ................ G06F 8/65 |
| 2019/0286457 A1* | 9/2019 | Tomatsu ................ G06F 8/61 |
| 2021/0051000 A1* | 2/2021 | Yang ................ H04L 63/123 |
| 2021/0118246 A1* | 4/2021 | Michalakis ............... G06F 8/44 |

FOREIGN PATENT DOCUMENTS

| | | |
|---|---|---|
| CN | 110636135 A | 12/2019 |
| EP | 3783860 A1 | 2/2021 |
| KR | 20180078764 A | 7/2018 |

OTHER PUBLICATIONS

International Search Report and Written Opinion of the International Searching Authority directed to related International Patent Application No. PCT/EP2021/070728, mailed Apr. 21, 2022; 11 pages.

International Preliminary Report on Patentability directed to related International Application No. PCT/EP2021/070728, mailed Nov. 3, 2022; 8 pages.

* cited by examiner

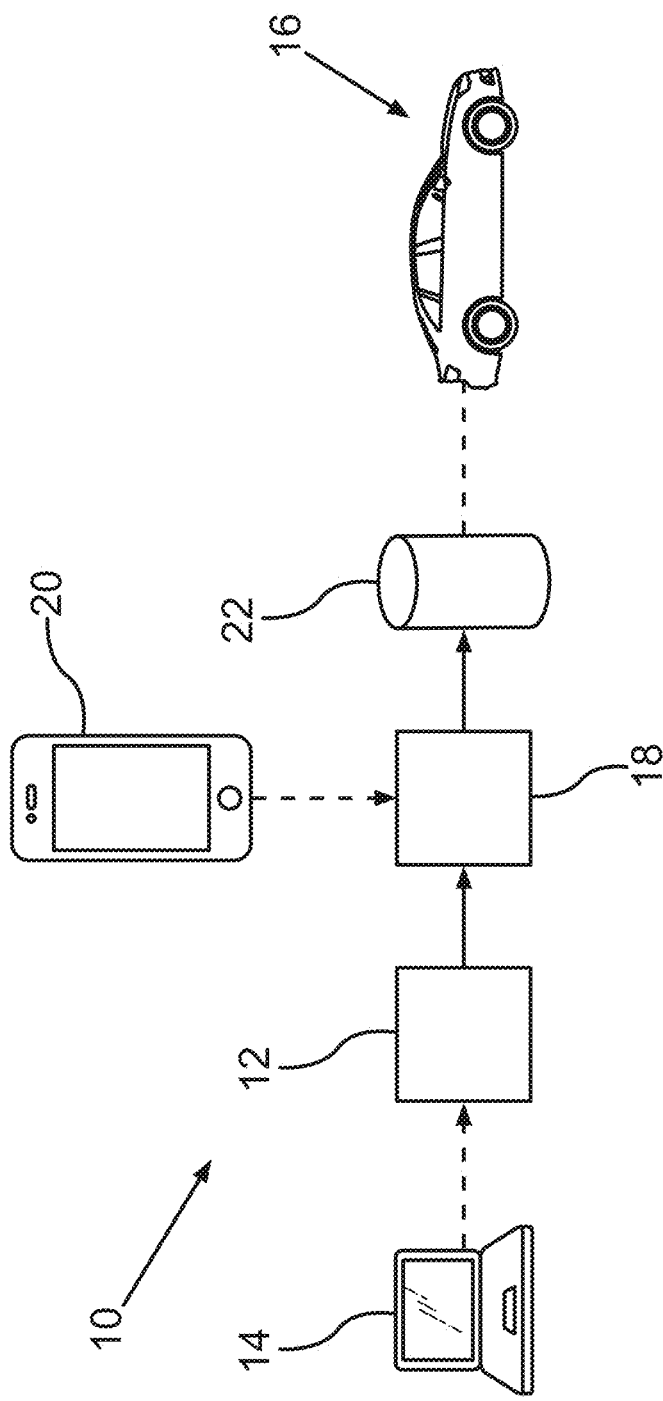

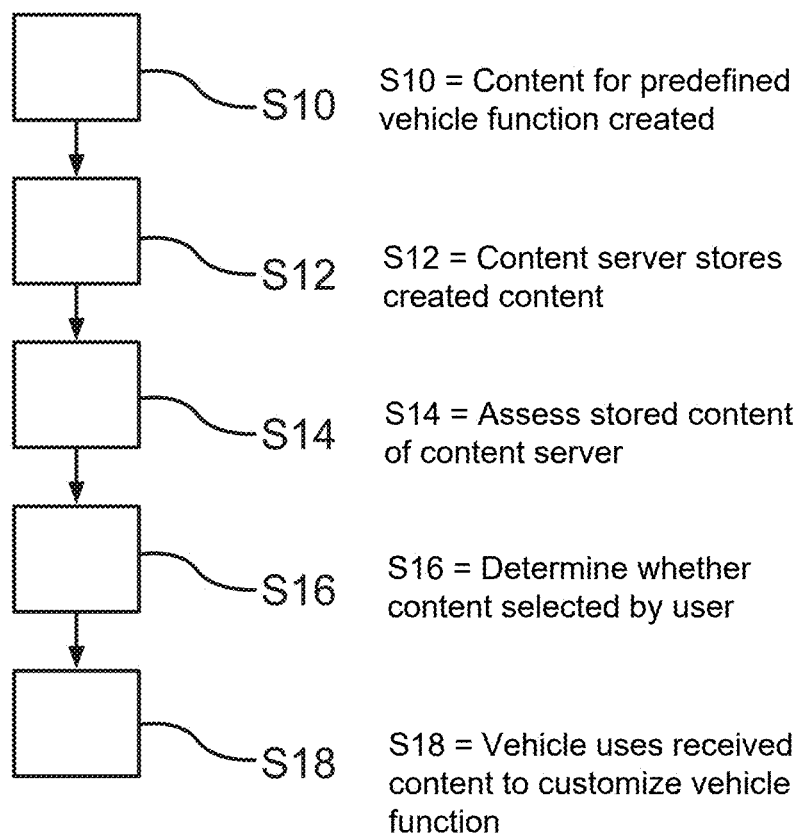

SYSTEM AND METHOD FOR CUSTOMIZING A VEHICLE FUNCTION

TECHNICAL FIELD

The present disclosure is concerned with a system for customizing a vehicle function and a method for customizing a vehicle function.

BACKGROUND

Vehicle owners and users have very few opportunities to customize vehicle functions after purchasing the vehicle, wherein vehicle functions can comprise new sounds, optical content and control software for vehicle devices. In order to customize vehicle functions, it has so far been necessary to go to service stations to make the changes. In addition, the amount of available content for customizing vehicle functions is limited because so far almost only developers of the vehicle manufacturer deliver new content as few possibilities are provided for third party developers to legally work on and offer content.

In particular, a platform is missing, where developers and vehicle owners can offer and obtain content for customizing vehicle functions in a safe and reliable way without compromising the operation of the vehicle.

In CN 110 636 135 A an intelligent network automobile system is disclosed. The system comprises a vehicle, an application and a platform built by a vehicle factory for producing the vehicle, wherein the platform comprises a service server and a security policy server, wherein an application provided by the application provider is accessed through the service server, verified through the security policy server and then stored in the security policy server, and wherein the vehicle downloads/upgrades the application from the security policy server.

In EP 3 783 860 A1 a system and a method for developing a third-party application is disclosed. The system includes a vehicle mounted device and a developer platform communicating with each other. The vehicle mounted device generates a corresponding API according to a protocol analysis mode of a vehicle signal and API specifications, adds the API to a software development kit SDK, and sends the API to the developer platform. The developer platform publishes the SDK so that a developer can develop a third-party application according to the API in the SDK.

In KR 2018 0078764 A a method for providing a verification procedure through a test of an application executable in a vehicle terminal and supporting the application to be registered in a market portal server is disclosed.

BRIEF DESCRIPTION OF DRAWINGS/FIGURES

FIG. 1 illustrates a schematic representation of an embodiment of the motor vehicle.

FIG. 2 illustrates a schematic representation of a driving situation.

DETAILED DESCRIPTION

It is an object of the present disclosure to provide an improved possibility for customizing a vehicle function.

The object is accomplished by the subject matter of the independent claims.

Further advantageous embodiments and variations are disclosed in the dependent claims, the following description and the figures.

One aspect relates to a system for customizing a vehicle function, comprising a developer platform with an application programming interface (API) to create content for at least one predefined vehicle function, wherein the developer platform is configured to transmit the created content to a content server and wherein the content server is configured to receive and store the created content. The system further comprises a mobile device comprising an application, wherein the application is configured to access the content server and provide the stored content of the content server for selection, and a vehicle configured to receive selected content and customize the vehicle function with the received content.

In other words the system may at least comprise a developer platform, a content server, a mobile device and a vehicle. The developer platform may provide the application programming interface to create the content for customizing the vehicle function. The application programming interface provides the tools and/or services for the programmer or developer, for example sub-routines, methods, object specifications and/or software libraries. Preferably, the vehicle functions to customize are predefined by the API, so that no safety relevant functions are changed by the content. The developer platform can be a program downloaded to a local computing device and/or a web interface that can be accessed online. Preferably, only authenticated developers with an approved account can access the developer platform and create content.

The created content can then be transmitted from the developer platform to the content server that stores the created content. Before storing the content in the content server, a verification and safety check can be performed, especially via a validation program and/or by reviews of the vehicle manufacturer. Preferably, the content server is a server on the internet, especially a cloud computing server. In addition to the data layer for storing the created content, the content server can further comprise services for data maintenance, support, account information and access rights to obtain the content.

Particularly preferred, the stored content on the content server is constantly surveilled based on latest legal and other factors, e.g. customer sentiment to ensure that content is continuously curated. That is, if content "slips through" quality control, as new, improved algorithms and detection routines of the validation program are deployed, the content may yet be rejected.

The stored content of the content server may be browsed using an application on a mobile device, wherein for example information about the content and the vehicle function, reviews, image meta data, copyright data, geotracking data and other pertinent information may be retrieved. The mobile device can be, for example, a smartphone, a laptop, a tablet computer and/or other handheld computers. Alternatively, the content can be accessed by desktop computers and/or by a vehicle infotainment system, if the vehicle is stationary and/or by a passenger not engaged in driving tasks.

After content has been selected via the application, the content from the content server can be transferred to the vehicle that is configured to receive the selected content and customize the respective vehicle function with the selected and received content. The vehicle is preferably designed as a motor vehicle, in particular as a passenger vehicle or a truck, or as a bus or a motorcycle. The content can preferably be transmitted wirelessly, in particular using WiFi, Bluetooth and/or a mobile communication technology such as 5G. The vehicle can comprise a head unit or vehicle computer that is configured to install the content and thereby change and customize one or more vehicle functions.

The present disclosure provides the advantages, that an easy and fast possibility to customize vehicle functions is provided. By means of the developer platform, a possibility for third-party developers can be provided to create third-party content that opens up the possibility to create more content and have a greater variation in the content provided. All created content, which is preferably verified, can then be stored on a trusted content server that increases the willingness to use and receive created content. Moreover, a separation of the developer platform and the content server improves the security of the process.

Since not all vehicles have a display for searching and selecting content, using the mobile device to select content offers the advantage to being able to select content for these vehicles as well. Thus, also vehicles without displays can be customized by the created content. Furthermore, the users can make their selection from any place without the need to be in the vehicle. Another advantage is that the vehicle that is adapted to receive the selected content by a wireless data connection and to autonomously customize the vehicle function. That avoids the need to drive to a service station for customizing the vehicle function.

The present disclosure also comprises embodiments that provide features which afford additional technical advantages.

In one embodiment the developer platform is a web-based device, wherein the API is configured as a web interface. In other words, the developer platform can be accessed online, for example by a hypertext transfer protocol (http). Thus, the developer platform can be reached from everywhere without the need of special hardware requirements besides a data connection. The API as web interface can comprise a graphical user interface, wherein the predefined vehicle functions can be selected and adapted, for example by uploading sounds and/or optical content wherein the web interface preferably provides a capability of bulk upload the sounds and/or optical content. Also configurations and settings of vehicle functions can be changed to create content. Furthermore, the developer platform may be configured to link other, especially third party, APIs, such that image and/or sound libraries can be searched from the developer platform for the purpose of generating content to customize the vehicle function.

In another embodiment, the developer platform comprises a validation program configured to determine, if the created content violates an operation criterion of the vehicle. In case the validation program determines, that the created content violates the operation criterion, the developer can be warned and/or a transmission of the created content to the content server can be denied. The operation criterion of the vehicle can comprise, if the content is against the law, if it violates safety regulations and/or violates company rules, wherein the company rules may comprise rules for copyright and/or good taste. Preferably, the validation program is an artificial intelligence that monitors the created content, either during creation of the content or after creation of a content, whether the operation criterion is violated. Therefore, the artificial intelligence can be trained using a machine learning algorithm, especially supervised learning. For example, an authorized person can perform a release check of the created content before a transmission to the content server. The release check can then be used by the validation program as training data to automatically find violations against the operation criterion. A violation to the operation criterion can exist, for example, if the content is a background image for a display of an infotainment system in which the contrast between a text, e.g. "navigation", "radio" or "system settings", and the background is too low to recognize the text. Furthermore, traffic symbols or in general content that distracts a driver from driving may violate the vehicle operation criterion. This embodiment provides the advantage, that the content that is created can be reviewed in a highly automated manner, which can save costs and accelerate the development process for new content.

In another embodiment, the content server is further configured to determine, if a release criterion is met for the selected content, and to only release the selected content for transfer to the vehicle, if the release criterion is met. Therefore, only content for which a user is authorized is installed in the vehicle. The release content can comprise information about the user and the vehicle. For example, to determine whether the release criterion is met, an account of the user can be checked, that comprises information about the mobile device and the respective vehicle, so that only content of the user's own vehicle can be customized. Moreover, the release criterion can comprise whether the vehicle function for which content was selected is actually available in the respective vehicle. Furthermore, the release criterion can comprise an information, whether, for example, a payment has been made for the selected content. This embodiments results in the advantage that suitable content is selected and installed in the vehicle only by authorized users, wherein an authorized user may be the vehicle owner who can grant rights to others to modify vehicle functions.

In another embodiment the system comprises a backend proxy server configured to establish a data connection between the content server and the vehicle to transfer the selected content to the vehicle. In other words, the content server does not transmit the content to the vehicle directly, but via a backend proxy server. Preferably, the backend proxy server can comprise connection information to the respective vehicle to transfer the content correctly. This physical and electronic separation of the content server responsible for storage and the backend proxy server responsible for sending data to the vehicles has the advantage that a security for the system is improved.

In another embodiment, the application of the mobile device is further configured, to access meta data of the created content and to provide additional information of the content using the meta data. For example, the meta data can provide information for which vehicle models the content is suitable for, copyright information, geo-tagging data, image meta data, reviews of the content, pricing data and other pertinent information. The meta data can also offer an information to generate search queries, for example, to search for images or other features. Furthermore, the meta data can be used to create statistics of the selected content, wherein the statistics can be retrieved by a dashboard. Moreover, a ranking of popular content can be provided by the meta data for a better and faster selection of a content.

According to another embodiment, the developer platform is further configured to generate a unique signature for each created content, wherein the vehicle is configured to verify the respective signature and customize the vehicle function only by content having the verified signature. The signature can preferably also be used to trace the content back to a developer. The unique signature is preferably protected, that is, the signature may be encrypted and/or fraud resistant. For example, the signature can contain a cryptographic hash, preferably generated by a block chain method. The advantage of this embodiment is that the origin of each content can be traced back what enhanced the security of the vehicle. Furthermore, it can be ensured that only the approved developer platform is used to create content.

According to a further embodiment, the content provides a sound mapped to a sensor and/or actor signal of the vehicle as vehicle function. That means that signals from sensors and actors of the vehicle can be connected to sounds by the content. Thus, the sounds can be played upon execution of specific on-board actions. For example, sounds can be mapped to the opening and closing of windows or doors. Preferably, the sounds are played automatically when a predefined vehicle condition is detected and are not activated manually. By this embodiment particularly preferred customization of the vehicle function can be achieved.

In another embodiment the content provides optical content for customizing optical vehicle functions. For example, optical vehicle functions can comprise interior lights, exterior lights and/or a display in the vehicle, wherein the optical content can be used to customize a presentation of these devices. In Particular, the optical content can be used to trigger an internal light setting upon execution of specific on-board actions. Furthermore, vehicle interiors can be adapted by changing light colours and/or to change a background image or symbol styles of a display. By this embodiment another particularly preferred modification of a vehicle function can be achieved.

In another embodiment the content provides an engine configuration to customize a vehicle engine function. In other words, it is possible to tune engines remotely, for example by pushing so called ODX-files to engine ECUs. This turns an extremely slow process of visiting a tuning specialist and waiting for software to be manually downloaded onto vehicles into a fast process of approximately 10 Minutes. Preferably, the engine configuration can comprise fuel-and energy-saving modes, sport modes and/or comfort modes.

Another aspect relates to a method for customizing a vehicle function, wherein a content for at least one predefined vehicle function is created on a developer platform with an application programming interface, wherein the developer platform transmits the created content to a content server, wherein the content server receives and stores the created content, wherein the stored content is accessed by an application of a mobile device, wherein the content server determines, if content is selected using the application, wherein selected content is transmitted from the content server to a vehicle, and wherein the vehicle customizes the vehicle function with the transmitted content. By this aspect the same advantages and variations as with the system can be obtained.

The present disclosure also comprises embodiments of the inventive method that comprise features that correspond to features as they have already been described in connection with the embodiments of the inventive system. For this reason, the corresponding features of the embodiments of the inventive method are not described here again.

The present disclosure also comprises a control device for the motor vehicle. The control device may comprise a data processing device or a processor circuit adapted to perform the customization of the vehicle functions by the transmitted content. For this purpose, the processor circuit may comprise at least one microprocessor and/or at least one microcontroller and/or at least one FPGA (field programmable gate array) and/or at least one DSP (digital signal processor). Furthermore, the processor circuit may comprise program code which comprises computer-readable instructions to perform the embodiment of the method according to the present disclosure when executed by the processor device. The program code may be stored in a data memory of the processor device.

The present disclosure also includes further embodiments of the method according to the present disclosure which comprise features as already described in connection with further embodiments of the motor vehicle according to the present disclosure. For this reason, the corresponding further embodiments of the method according to the present disclosure are not described again here.

The present disclosure also comprises the combinations of the features of the different embodiments.

The embodiment explained in the following is a preferred embodiment of the present disclosure. However, in the embodiment, the described components of the embodiment each represent individual features of the present disclosure which are to be considered independently of each other and which each develop the present disclosure also independently of each other and thereby are also to be regarded as a component of the present disclosure in individual manner or in another than the shown combination. Furthermore, the described embodiment can also be supplemented by further features of the present disclosure already described.

In the figures identical reference signs indicate elements that provide the same function.

FIG. 1 shows a schematic system 10 for customizing a vehicle function according to an exemplary embodiment. The system 10 can comprise a developer platform 12 that is preferably a web based device. The developer platform 12 may be accesses by developer with a computer 14, wherein the computer 14 can access and application programming interface of the developer platform 12 that is configured as web interface, preferably a graphical user interface, to create content for at least one predefined vehicle function of a vehicle 16.

In this example, the developer may create content that provides a sound mapped to a sensor and/or an actor signal of the vehicle 16. For example, the developer creates a content such that a welcome sound is played when opening a car door. Therefore, the developer can access the developer platform 12 upload a welcome sound use the application programming interface to map the sound to a sensor indicating an opening of the door.

While creating this content, an validation program of the developer platform 12 can monitor the content, for example if the welcome sound violates an operation criterion of the vehicle 16, wherein the operation criterion can comprise whether the sound impairs an operation of the vehicle 16 or infringes a copy right. If the created content violates the operation criterion, a warning can be displayed to the developer and offering of the content can be blocked. If the created content does not violate the operation criterion, the content can be transferred to a content server 18, wherein in addition, a unique signature can be added to the content, which allows the content to be traced back to the developer and also allows verification of the content before customizing the vehicle function.

The content server 18 can be physically and electronically separated from the developer platform 12 to improve security. On the content server 18 all the created content can be stored together with meta data information about the content, for example the name of the developer, effects of a content, reviews, pricing and other information.

This stored content on the content server can then be accessed by an application of a mobile device 20 that can be a smart phone. By means of the application, an owner of the vehicle 16 can browse through the content and for example select the created content for mapping a welcome sound to the opening of a vehicle door. After selecting the content it may be further determined, if a release criterion is met for the selected content before the selected content is transferred to the vehicle 16. The release criterion may comprise a query if the vehicle 16 have the vehicle functions available to be customized and/or if a payment for the content was made. If the release criterion is met, a backend proxy server 22 can be triggered by the content server 18 to establish a connection to the vehicle 16, wherein the connection is preferably a data connection like WiFi, 5G and/or Bluetooth.

The vehicle 16 is configured to receive the selected content via the data connection and adapt the vehicle function with the received content. Therefore, the selected content can be installed in a head unit of the vehicle 16 that maps the welcome sound to the sensor signal of the vehicle door sensor.

It should be noted that the example shown above is only one of several ways to customize a vehicle function, and that other vehicle functions, especially a whole range of actuators and electronic control units, can also be customized, for example, seats, air suspension, sound equalizers, air conditioning status, releasing scents into the vehicle, integration of voice assistants, optical vehicle functions by optical content, vehicle engine functions by content comprising engine configurations and many more.

FIG. 2 illustrates a schematically process chart of a method for customizing a vehicle function. In a step as S10 content for at least one predefined vehicle function is created on a developer platform 12 with an application programming interface, wherein the developer platform 12 transmits the created content to a content server 18.

In a step as S12, the content server 18 receives and stores the created content. The content server 18 is preferably a cloud based server and the content can comprise additional information regarding content pricing, reviews, copyright, geo-tagging data, image meta data and other information.

In a step as S14, a mobile device 20 assesses the stored content of the content server 18 by means of an application. In this case, the application may act as a storefront for the content and can be used by interested users to browse and purchase content.

In a step as S16 the content server determines, whether content is selected by the user using the application, wherein the selected content is transmitted from the content server 18 to the vehicle 16, preferably via the backend proxy server 22 to improve the security of the system 10.

Finally, in a step as S18 the vehicle 16 uses the received content to customize the respective vehicle function automatically.

Overall, the examples show how a multisided digital platform offering car related products can be provided.

The invention claimed is:

1. A system for customizing a vehicle function, the system comprising:
a developer platform having an application programming interface (API), wherein the developer platform is configured to create content for a predefined vehicle function, wherein the developer platform is configured to transmit the created content to a content server, and wherein the developer platform comprises a validation program configured to:
determine whether the created content violates an operation criterion of a vehicle, and
in response to a determination that the created content violates the operation criterion of the vehicle, warn a developer and/or deny a transmission of the created content to the content server, wherein the operation criterion comprises at least one of:
whether the content is against a law,
whether the content violates safety regulations, or
whether the content violates company rules;
the content server configured to receive and to store the created content, wherein the content server is further configured to:
monitor the stored created content in the content server based on the validation program, wherein the validation program determines a rejection of the content based on customer sentiment associated with the content;
a mobile device comprising an application, wherein the application is configured to access the content server and provide the stored created content of the content server for selection; and
the vehicle configured to receive selected content and to customize the vehicle function with the received content,
wherein the developer platform, the content server, and the mobile device comprise a memory configured to store operations, and one or more processors configured to perform the operations.

2. The system according to claim 1, wherein the developer platform is a web-based device, and wherein the API is configured as a web interface.

3. The system according to claim 1, wherein the content server is further configured to:
determine that a release criterion is met for the selected content; and
in response to a determination that the release criterion is met, release only the selected content for transfer to the vehicle,
wherein the release criterion comprises whether a user is authorized to install the selected content in the vehicle.

4. The system according to claim 1, wherein the system further comprises a backend proxy server configured to establish a data connection between the content server and the vehicle to transfer the selected content to the vehicle.

5. The system according to claim 1, wherein the application of the mobile device is further configured to access meta data of the created content and to provide additional information of the content using the meta data.

6. The system according to claim 1, wherein the developer platform is further configured to generate a unique signature for each created content, and wherein the vehicle is further configured to verify a respective signature and to customize the vehicle function only by respective content having the verified respective signature.

7. The system according to claim 1, wherein the content provides a sound mapped to a sensor and/or an actor signal of the vehicle as the vehicle function.

8. The system according to claim 1, wherein the content provides optical content for customizing optical vehicle functions, and wherein the optical vehicle functions comprise an interior light, an exterior light and/or a display in the vehicle.

9. The system according to claim 1, wherein the content provides an engine configuration to customize a vehicle engine function.

10. A method for customizing a vehicle function, the method comprising:
creating, on a developer platform having an application programming interface (API), a content for a predefined vehicle function;
determining, by a validation program of the developer platform, whether the created content violates an operation criterion of a vehicle, wherein the operation criterion comprises at least one of:
whether the content is against a law,
whether the content violates safety regulations, or
whether the content violates company rules;
in response to a determination that the created content violates the operation criterion:
warning a developer and/or denying a transmission of the created content to a content server;
in response to a determination that the created content does not violate the operation criterion:
transmitting, by the developer platform, the created content to the content server;
receiving, by the content server, the created content;
storing, by the content server, the created content;
monitoring, by the content server, the stored created content in the content server based on the validation program, wherein the validation program determines a rejection of the content based on customer sentiment associated with the content;
accessing, by an application of a mobile device, the stored created content; and
determining, by the content server, if at least one portion of the stored created content is selected by a user using the application;
in response to a determination that the at least one portion of the stored created content being selected by the user using the application:
transmitting the selected content from the content server to the vehicle; and
customizing, by the vehicle, the vehicle function according to the transmitted content.

* * * * *